United States Patent
Coots (10) Patent No.: US 9,446,662 B2
(45) Date of Patent: Sep. 20, 2016

(54) AUXILIARY DRIVE SYSTEM

(71) Applicant: B & B Metals, Inc., Shepherdsville, KY (US)

(72) Inventor: William R. Coots, Lebanon Junction, KY (US)

(73) Assignee: B & B Metals, Inc., Shepherdsville, KY (US)

( * ) Notice: Subject to any disclaimer, the term of this patent is extended or adjusted under 35 U.S.C. 154(b) by 383 days.

(21) Appl. No.: 13/774,412

(22) Filed: Feb. 22, 2013

(65) Prior Publication Data

US 2014/0238158 A1    Aug. 28, 2014

(51) Int. Cl.
*B60K 25/06* (2006.01)
*B60K 17/28* (2006.01)
*B60F 1/04* (2006.01)

(52) U.S. Cl.
CPC .............. *B60K 17/28* (2013.01); *B60F 1/043* (2013.01); *B60K 25/06* (2013.01); *B60F 2301/02* (2013.01)

(58) Field of Classification Search
CPC ...... B60K 17/28; B60K 25/06; B60K 17/10; B60F 1/043; B60F 1/02; B60F 1/005
USPC .......... 74/15.84, 15.86; 180/53.1, 53.2, 53.4, 180/53.6; 102/215.2
See application file for complete search history.

(56) References Cited

U.S. PATENT DOCUMENTS

| | | |
|---|---|---|
| 567,232 A | 9/1896 | Greenshield |
| 594,731 A | 11/1897 | Dowe |
| 636,702 A | 11/1899 | Wilton |
| 703,755 A | 7/1902 | Bender |
| 712,167 A | 10/1902 | Wood |
| 832,332 A | 10/1906 | McConnell |
| 832,333 A | 10/1906 | McConnell |
| 832,334 A | 10/1906 | McConnell |
| 1,593,423 A | 7/1926 | Bradley |
| 1,853,572 A | 4/1932 | Nugent |
| 1,881,045 A | 10/1932 | Chapin |
| 1,937,532 A | 12/1933 | Ronk |

(Continued)

FOREIGN PATENT DOCUMENTS

| | | |
|---|---|---|
| EP | 0089936 | 9/1983 |
| GB | 2 052 406 A | 1/1981 |

(Continued)

OTHER PUBLICATIONS

Canadian Intellectual Property Office, Patent Application and Filing Certificate for "Auxiliary Drive System" filed Feb. 20, 2014, Canadian Intellectual Property Office, Gatineau, Quebec, Canada.

(Continued)

*Primary Examiner* — Ruth Ilan
(74) *Attorney, Agent, or Firm* — Middleton Reutlinger (57) ABSTRACT

An auxiliary drive system including a transmission which is connectable to a prime mover and produces an output torque for driving a driveshaft, the transmission having at least first and second power takeoffs, a pump in fluid communication with a hydraulic motor, the hydraulic motor operably connected to the second power takeoff and in fluid communication with the hydraulic pump, a control valve to vary flow rate to the hydraulic motor, the second power takeoff driving a driveshaft operably connected to the transmission.

24 Claims, 4 Drawing Sheets

(56) References Cited

U.S. PATENT DOCUMENTS

| | | | |
|---|---|---|---|
| 2,135,307 A | 11/1938 | Keator | |
| 2,157,651 A | 5/1939 | Fildes | |
| 2,541,514 A | 2/1951 | Herold | |
| 2,747,677 A | 5/1956 | Barfield | |
| 2,762,313 A | 9/1956 | Sublett | |
| 2,896,553 A | 7/1959 | Whisler | |
| 2,959,260 A | 11/1960 | Johnson et al. | |
| 3,019,742 A | 2/1962 | Kershaw | |
| 3,198,137 A | 8/1965 | White, Jr. | |
| 3,241,628 A * | 3/1966 | Thomas | B60K 17/10 180/53.2 |
| 3,282,506 A | 11/1966 | Holstein | |
| 3,344,747 A | 10/1967 | Keller | |
| 3,516,576 A | 6/1970 | Elliott | |
| 3,581,671 A * | 6/1971 | Hart | B60F 1/005 105/72.2 |
| 3,596,728 A | 8/1971 | Neville et al. | |
| 3,599,814 A | 8/1971 | Brownfield | |
| 3,779,608 A * | 12/1973 | Hatcher | B23D 59/02 173/24 |
| 3,804,025 A | 4/1974 | Elliott | |
| 3,877,390 A | 4/1975 | Wallace | |
| 3,881,565 A | 5/1975 | Parrish | |
| 3,943,858 A | 3/1976 | Dieringer et al. | |
| 4,048,925 A | 9/1977 | Storm | |
| 4,168,771 A | 9/1979 | Krivec | |
| 4,241,663 A | 12/1980 | Lund et al. | |
| 4,415,053 A | 11/1983 | Fulford | |
| 4,442,904 A | 4/1984 | Wibom | |
| 4,468,966 A | 9/1984 | Bradshaw | |
| 4,520,735 A | 6/1985 | Field | |
| 4,534,297 A | 8/1985 | Johnson, Sr. | |
| 4,581,949 A * | 4/1986 | Mann | B60K 17/04 180/53.2 |
| 4,631,639 A | 12/1986 | Biraud | |
| 4,686,909 A | 8/1987 | Burleson | |
| 4,691,639 A | 9/1987 | Holley | |
| 4,705,450 A * | 11/1987 | Gano | E02F 9/123 180/323 |
| 4,784,063 A | 11/1988 | Theurer et al. | |
| 4,828,452 A * | 5/1989 | Bolitho | B60F 1/043 105/215.2 |
| 4,846,581 A * | 7/1989 | Osterlund | B60K 20/00 180/321 |
| 4,923,355 A | 5/1990 | Mancini | |
| 4,942,822 A | 7/1990 | Cotic | |
| 4,974,518 A | 12/1990 | Cotic et al. | |
| 5,103,740 A | 4/1992 | Masse | |
| 5,131,798 A | 7/1992 | Bell et al. | |
| 5,167,295 A | 12/1992 | Moog | |
| 5,168,627 A | 12/1992 | Owen | |
| 5,190,118 A * | 3/1993 | Yelton | B60K 6/00 180/321 |
| 5,226,497 A * | 7/1993 | Beaton | B60K 25/00 180/324 |
| 5,366,556 A | 11/1994 | Prince et al. | |
| 5,401,544 A | 3/1995 | Nakahata et al. | |
| 5,592,883 A | 1/1997 | Andress, III | |
| 5,635,245 A | 6/1997 | Kimock et al. | |
| 5,637,353 A | 6/1997 | Kimock et al. | |
| 5,655,455 A | 8/1997 | Smith | |
| 5,802,980 A | 9/1998 | Hofmiller | |
| 5,858,077 A | 1/1999 | Kayanoki | |
| 5,879,775 A | 3/1999 | Walter et al. | |
| 6,012,396 A | 1/2000 | Schulz | |
| 6,015,019 A * | 1/2000 | Grimes | B60K 17/28 180/324 |
| 6,021,719 A | 2/2000 | Kershaw, Jr. | |
| 6,062,327 A | 5/2000 | Ketting et al. | |
| 6,101,953 A | 8/2000 | Spata | |
| 6,129,026 A | 10/2000 | LeCroy | |
| 6,134,775 A | 10/2000 | Castillo | |
| 6,171,646 B1 | 1/2001 | Gerhardinger | |
| 6,199,485 B1 | 3/2001 | Pyle | |
| 6,308,411 B1 * | 10/2001 | Wright, Jr. | B21D 11/20 29/448 |
| 6,352,035 B1 | 3/2002 | Kashiwase et al. | |
| 6,726,814 B2 | 4/2004 | Ohmi et al. | |
| 6,807,909 B1 | 10/2004 | Coots | |
| 6,976,432 B2 | 12/2005 | Jacob | |
| 7,082,879 B2 | 8/2006 | Alt | |
| 7,201,106 B2 | 4/2007 | Whiston et al. | |
| 7,406,919 B2 | 8/2008 | Coots | |
| 7,669,414 B2 | 3/2010 | Loeffler | |
| 7,827,916 B2 | 11/2010 | Coots, Jr. | |
| 8,166,883 B1 | 5/2012 | Coots | |
| 2002/0078853 A1 | 6/2002 | Holmes et al. | |
| 2003/0223167 A1 | 12/2003 | Wright | |
| 2005/0217532 A1 | 10/2005 | Conneally | |

FOREIGN PATENT DOCUMENTS

| | | |
|---|---|---|
| WO | 9518723 | 7/1995 |
| WO | 2007117603 A2 | 10/2007 |

OTHER PUBLICATIONS

Canadian Intellectual Property Office, Office Action, Feb. 10, 2015, pp. 1-5, Canadian Intellectual Property Office, Gatineau, Quebec, Canada.

* cited by examiner

AUXILIARY DRIVE SYSTEM

STATEMENT REGARDING FEDERALLY SPONSORED RESEARCH

None.

REFERENCE TO SEQUENTIAL LISTING, ETC.

None.

CLAIM TO PRIORITY

None.

BACKGROUND

1. Field of the Invention

The present invention relates to an auxiliary drive or self-propel system for driving a high-rail vehicle along railroad tracks. More specifically, the present invention relates to an apparatus for driving the vehicle along railroad tracks from a location remote from the cab, eliminating the need for an additional operator during railroad track maintenance.

2. Description of the Related Art

Railroad tracks generally consist of two parallel steel rails, which are positioned on transverse railroad ties. Railroad ties are normally laid on a bed of coarse stone known as ballast, which combines resilience, some amount of flexibility, and good drainage characteristics. Railroad ties spread the load from the rails over the ballast, and substrate below, and also serve to hold the rails a fixed distance apart. The railroad ties are generally spaced apart a distance of about twenty-two inches on center although the distance may vary. On an upper surface of the railroad tie, is a tie plate. The tie plate connects the rail and the tie. Fasteners, such as spikes, screws or the like are often driven through a hole in the tie plate to hold the rail. Alternatively the rails may be clipped to the tie plates.

The steel rails generally have a foot, a web extending upwardly from the foot and a head. Additionally, the rails are spaced apart a preselected distance corresponding to wheel spacing of trains. The preselected distance between rails is known in the art as the gauge distance. Over time, deterioration and repeated loading stress requires that the railroad tie plates, as well as other components, be replaced at maintenance intervals. Various machines which deliver and position railroad tie plates along a railroad track bed have been suggested. One problem with these devices is that they require multiple workers to operate.

In order to maintain the operability of a railroad track, frequent maintenance repairs are needed. To make these repairs, a vehicle that can be driven on conventional road surfaces, as well as railroad tracks, is ideal. This allows one vehicle to be driven to the site and also be used on the railroad track to make the necessary repairs. For example, many job sites are at inconvenient locations, and have no road access. Therefore, it is necessary for one vehicle to transport the materials and operators to the particular job site and used for the maintenance work as well.

In order to drive these vehicles along the road and railroad track, current high-rail vehicles use one system, such as a roller to engage vehicle tires, to drive the vehicle when it is on the rail. This system goes through tremendous stresses in moving these high-rail vehicles and therefore may incur significant maintenance costs. Additionally, since this secondary or auxiliary system is used, it provides an additional point of failure.

It would be desirable to overcome these and other deficiencies in providing a high-rail vehicle capable of both on-road and on-rail travel.

SUMMARY

According to some embodiments, an auxiliary drive system, comprises a transmission having at least first and second power takeoffs therein, a hydraulic pump connected to the first power takeoff to receive input, the pump producing flow and being in communication with a hydraulic motor, the hydraulic motor operably connected to the second power takeoff and in fluid communication with the hydraulic pump, a control valve to vary flow rate to the hydraulic motor, the hydraulic motor driving a drive shaft operably connected to the transmission. The system wherein the transmission has gears associated with the first power takeoff and the second power takeoff. The system wherein the gears determining speed of rotation of said drive shaft. The system wherein at least one of the first and second power takeoffs rotates when the transmission is in neutral. The system wherein one of the first and second power takeoffs causes rotation of a driveshaft of the vehicle. The system wherein the system operably drives a high-rail vehicle for use on a rail. The system wherein a speed of the pump is constant. The system wherein a speed of the motor may be adjustable to change vehicle speed. The system further comprising a hydraulic control valve in fluid communication with the pump and the motor to adjust the vehicle speed.

According to some other embodiments, a method of driving a high-rail vehicle with an auxiliary drive system, comprises driving a hydraulic pump with a first power takeoff of a vehicle transmission, driving a hydraulic motor with the hydraulic pump, driving a second power takeoff of the vehicle transmission with the hydraulic motor, and, driving a drive shaft connected to the vehicle transmission with the second power takeoff. The method further comprising adjusting speed of the vehicle by changing speed of the motor. The method further comprising changing the speed of the motor with a hydraulic control valve. The method further comprising coupling the hydraulic pump and the hydraulic motor. The method further comprising driving the second power takeoff with the first power takeoff. The method further comprising driving a drive shaft operably connected to the transmission. The method further comprising driving tires of the vehicle which are operably connected to the driveshaft.

According to some other embodiments, an auxiliary drive system comprises a transmission which is connectable to a prime mover and produces an output torque for driving a driveshaft, the transmission having at least first and second power takeoffs, a pump in fluid communication with a hydraulic motor, the hydraulic motor operably connected to the second power takeoff and in fluid communication with the hydraulic pump, a control valve to vary flow rate to the hydraulic motor, the second power takeoff driving a driveshaft operably connected to the transmission. The auxiliary drive system further comprising a hydraulic tank in fluid communication with the pump, the motor and the control valve. The auxiliary drive system wherein the rotation of the second power takeoff causes rotation of the driveshaft. The auxiliary drive system wherein the pump rotating at a constant speed. The auxiliary drive system wherein the second power takeoff turning the driveshaft when the transmission is disengaged. The auxiliary drive shaft wherein the first power takeoff turns when the transmission is in neutral.

BRIEF DESCRIPTION OF THE DRAWINGS

In order that the embodiments may be better understood, embodiments of the auxiliary drive system in accordance with the present invention will now be described by way of examples. These embodiments are not to limit the scope of the present invention as other embodiments of the auxiliary drive system of the present invention will become apparent to one having ordinary skill in the art upon reading the instant description. Examples of the present invention are shown in figures wherein.

DETAILED DESCRIPTION

It is to be understood that the auxiliary drive system is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numeral indicate like elements throughout several views, there are shown in FIGS. 1 through 4 various aspects of an auxiliary drive system for a high-rail vehicle. The circuit eliminates the need for a roller system to rotate the tires of the vehicle. Instead, a hydraulic system is utilized to drive the existing drivetrain of the vehicle and turn the tires. Thus the hydraulic fluid causes rotation of the tires rather than the need for a separate structure to turn the tires. A method is further shown herein for performing the function described with the various structures disclosed.

Figure 1:
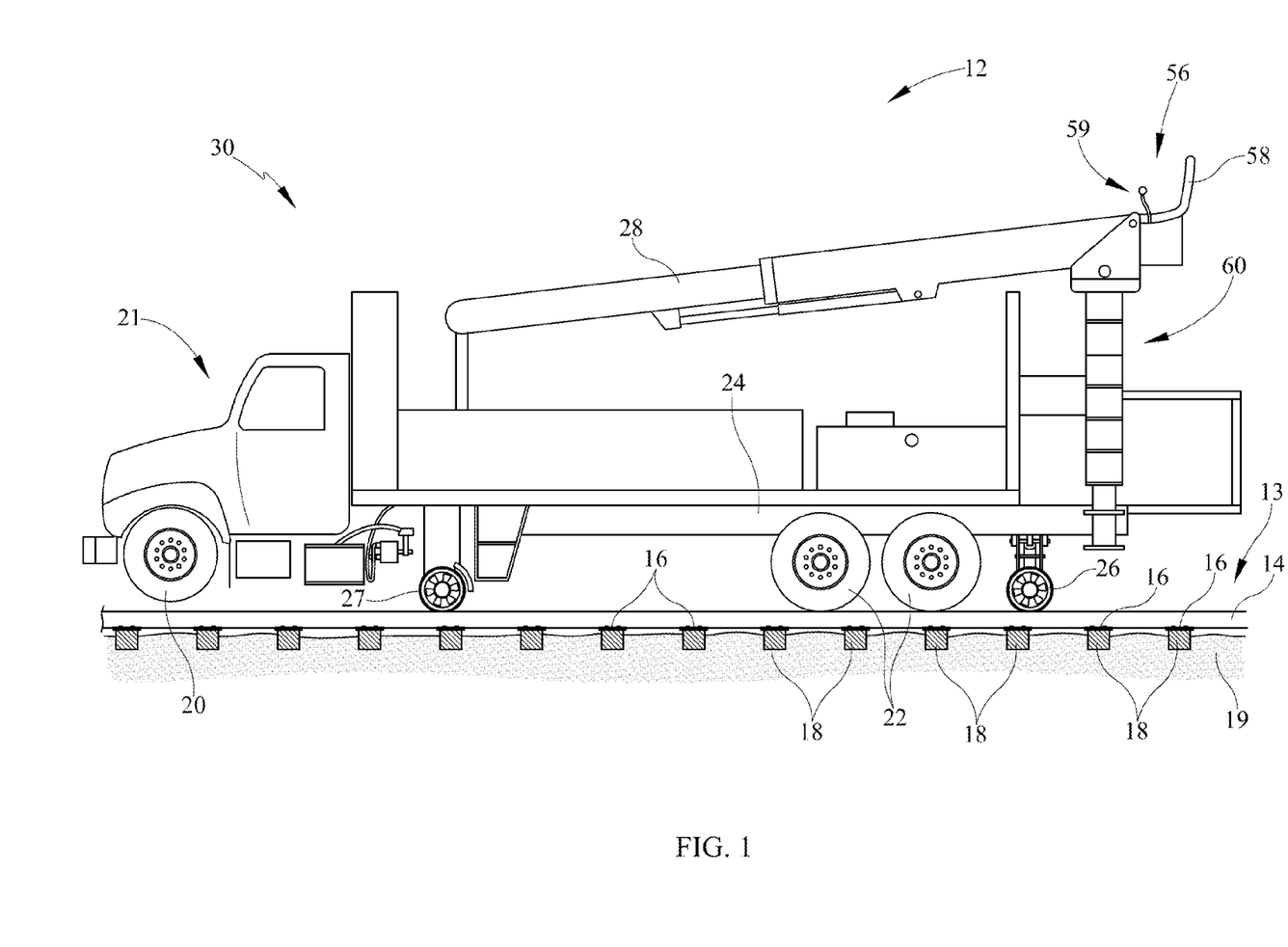
FIG. 1 is a side view of an exemplary high-rail vehicle having an auxiliary drive system.

Referring initially to FIG. 1, a side view of a high-rail truck 12 for servicing railroads is depicted having an auxiliary drive system 30 for movement along a railroad track assembly 13. The railroad track 13 includes a pair of rails 14 disposed on tie plates 16. The railroad ties 18 are positioned in ballast 19 which may be formed of various substrates which typically include some amount of gravel, rock or other material which provides a stable base and allows for proper drainage. Disposed on an upper surface of each railroad tie 18 is at least one tie plate 16 to connect the rails 14 to the railroad ties 18. In the exemplary embodiment, two tie plates 16 are positioned on each tie 18 corresponding to the two rails 14. The tie plates 18 are anchored to the railroad ties 16 and provide a place for positioning of the rails 14. Although a single track is shown in the side view, as one skilled in the art will understand two rails 14 are laid in parallel fashion and spaced apart at a preselected gauge distance providing the railroad track system.

The high-rail vehicle 12 employs a prime mover 31 (FIG. 3), such as a gasoline or diesel engine to power the vehicle 12 and provides propulsion for both on road and railway travel, according to the instant embodiment. The prime mover 31 is generally located beneath the hood, as will be understood by one skilled in the art. A transmission 32 and drive train transmit torque to at least one tire assembly, for example at least one axle of rear tires 22 to propel the vehicle 12 as will be understood by one skilled in the art. The vehicle 12 further comprises a cab 21 wherein an operator may drive the vehicle 12 on-road, on to the rails 14 and off of the rails 14.

In addition to the depicted use on rails 14, the high-rail or carrier vehicle 12 is also usable on public roads and includes the front road tires 20 and at least one set of rear road tires 22. Each of the tires 20, 22 is positioned about a wheel or wheel assembly.

The vehicle 12 also includes rail wheels 26 which allow movement along rails 14 by way of propulsion from at least one of the front and rear tires 20 and 22. The vehicle 12 also includes forward rail wheels 27 to guide movement along the rails 14. According to the instant embodiment, the rail wheels 26, 27 only guide the vehicle but do not cause propulsion thereof.

The rail wheels 26, 27 may be connected to a movable support structure depending from the chassis 24. The rail wheels 26, 27 are movable between a first position and a second position to either engage or disengage the track rail 14. The movement of the rail wheels 26, 27 may be linear or arcuate toward or away from the track rail 14. The rail wheels may be paired on an axle or may be on separate axles. According to a first position, the rail wheels 26, 27 are engaging the rails 14 to guide and/or drive the high-rail vehicle 12 along the rails 14. According to a second position, the rail wheels 26, 27 are moved away from the track rail 14 so that the high-rail vehicle 12 can drive off of the rails 14, on to the rails 14 or along a roadway.

The high rail vehicle 12 further comprises a chassis 24 which is supported by the on-road tires 20, 22. The chassis may be defined by a plurality of structures such as channel, box, or rectangular structures. The chassis 24 extends from a front area of the vehicle 12 toward a rear area of the vehicle 12. The vehicle chassis 24 supports further comprise a plurality of mechanisms utilized to sort and/or feed tie plates for disposition on a railroad 13 undergoing maintenance procedures. A crane 28 is located at the rear of the bed of the vehicle 12 for loading or unloading materials onto or off of the vehicle 12 as well as clearing debris from railway worksites as needed.

The prime mover 31 also provides power for hydraulic and electrical systems on the high-rail vehicle 12 as well as providing a power supply for various vehicle accessories, described further herein. The prime mover 31 may provide power for driving the high-rail vehicle 12 via a hydraulic system for conveyors and crane 28 or alternatively the high-rail vehicle 12 may utilize an independent prime mover for powering only the conveyors and other structures of the instant invention. For example, a generator may be disposed on the high-rail vehicle 12. The generator may provide a power source for powering electric components. The generator may also provide power, either electric or power for a hydraulic system, for structures such as gate and sensor assemblies, as well as a crane 28 on the high-rail vehicle 12.

The crane 28 is utilized to pick up tie plates 18 from a pile or hauling vehicle and move to a hopper (not shown) on the vehicle 12. The crane 28 includes a boom which is movable, extendable and retractable and which is supported by a support structure 60. The boom further includes a magnet to pick up multiple tie plates 18 and place in the hopper from various preselected loading sources or sites. From the hopper, the tie plates 18 may move across a conveyor for movement toward a tie plate slide or through a sorter.

Near the upper portion of a crane support 60 is a remote control cab 56. The remote cab 56 may include a covered cab or merely an uncovered seat area 58 as well as a plurality of controls 59. The remote cab 56 allows for control of outriggers, the crane boom as well as at least start, stop and throttle control for the self-propel system 30. By allowing control of the self-propel system 30, the remote cab 56 eliminates the need of a separate vehicle operator in the cab 21 when the high-rail vehicle 12 is positioned on the track rails 14. For example, a control valve (FIG. 2) controls speed of the vehicle during rail travel. Further, the remote cab 56 eliminates the need for an operator to stop the vehicle 12 in order to move from operation of the crane 28 to operation in the cab 21.

Figure 2:
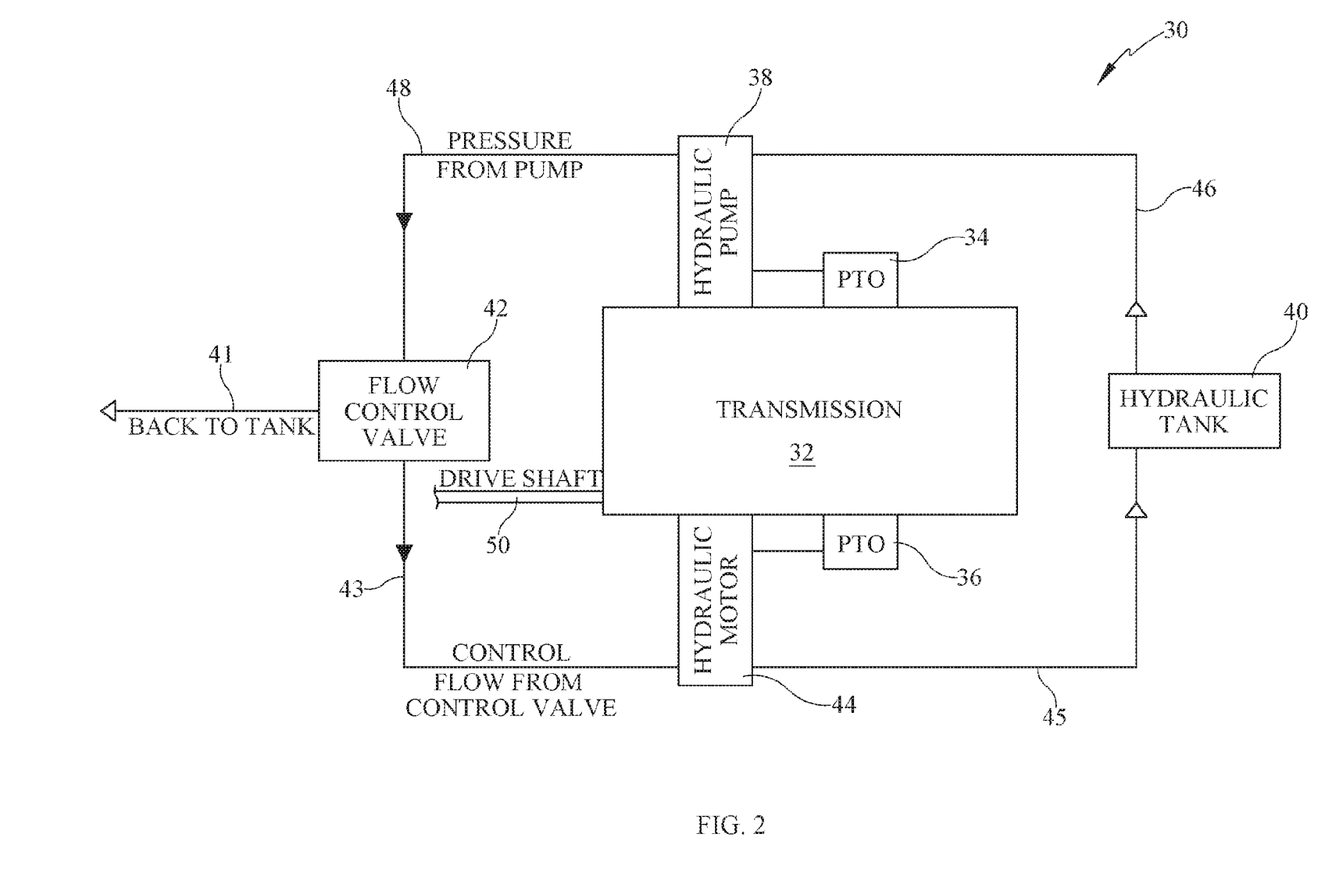
FIG. 2 is a schematic view of a hydraulic system for the exemplary auxiliary drive system.
Figure 3:
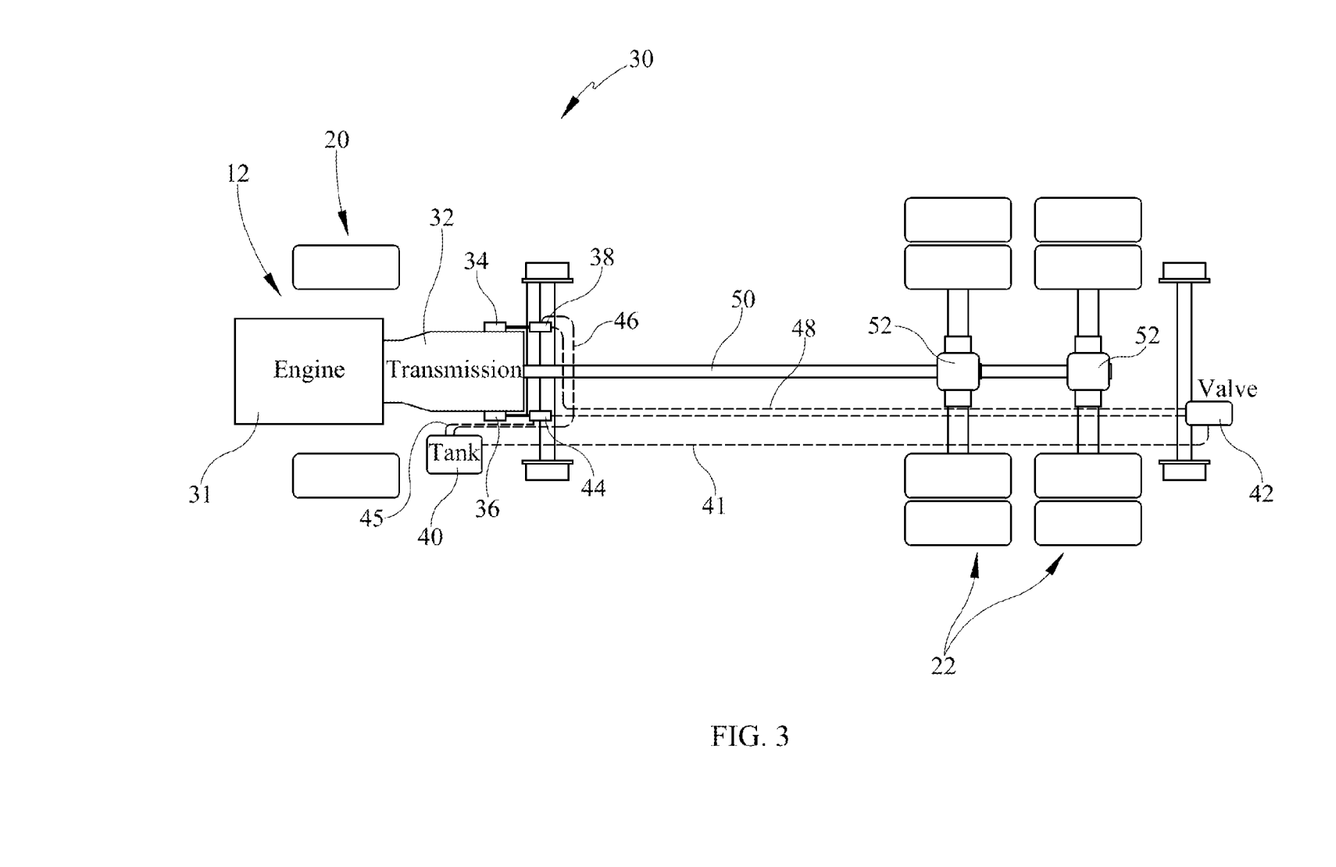
FIG. 3 is a top view of the high-rail vehicle driveline including the auxiliary drive system.

Referring now to FIG. 2, a schematic view of the auxiliary drive or self-propel system 30 is depicted. According to the instant embodiment, an auxiliary drive system 30 is provided which does not require use of additional roller structure to turn the tires of the vehicle 12 as in prior art devices. Instead, the structure utilizes a first power takeoff 34 of a transmission 32 to drive a second power takeoff 36. The second power takeoff 36 operates as input to the transmission 32 in order to drive a drive shaft 50 which rotates one or more tires 20, 22. The auxiliary drive system 30 includes a transmission 32 for the vehicle 12 and includes a first power takeoff 34. The transmission 32 may be a multi-gear system, for example, a ten-speed transmission having high torque characteristics including the at least two power takeoff connections 34, 36. One exemplary transmission is a Mack MAXITORQUE ES series, for example model T310. The first power takeoff 34 may operate continuously whether or not the transmission 32 is driveably engaged with the vehicle engine 31. Alternatively, the second power takeoff 36 is configured to rotate with rotation of a drive shaft 50 (FIG. 3). Accordingly, the rotation of the second power takeoff 36 may cause the drive shaft 50 (FIG. 3) to rotate. This allows the second power takeoff 36 to be utilized as an input to the transmission 32 and drive train when the engine 31 is disengaged, for example the transmission 32 is in neutral.

Since the first power takeoff 34 continues to rotate when the transmission 32 is not drivably engaged from the engine 31, for example in a neutral position, the first power takeoff 34 is mechanically connected to a hydraulic pump 38. This pump 38 is in fluid communication with a hydraulic tank 40 which holds a pre-determined amount of hydraulic fluid and a flow control valve 42. Thus, as the first power takeoff 34 rotates driving a pump 38, fluid is removed from the hydraulic tank 40 and forced to the flow control valve 42. The flow control valve 42 includes a first path 41 which returns to the hydraulic tank 40 and a second path 43 which is directed to a hydraulic motor 44. The hydraulic motor 44 rotates from the fluid pressure to drive the second power takeoff 36 which, as previously described, acts as an input to the transmission 32 when the engine 31 is disengaged from the transmission 32. With such input at the power takeoff 36, the transmission 32 may be driven by hydraulic power in order to drive a drive shaft 50. Hydraulic fluid returns to the tank 40 from the motor 44 through hydraulic fluid line 45.

With reference now to FIG. 3, the vehicle 12 is shown with the cab and bed area removed to reveal the engine 31 and transmission 32. Tires 20, 22 are shown at the forward and rear end of the vehicle 12. The engine 31 is disposed generally between the front tires 20 and the transmission 32 is connected to the engine 31 near the forward end of the vehicle. The power takeoffs 34, 36 are connected to the pump 38 and motor 44, respectively. Hydraulic line 46 extends from the tank to the pump 38 and second hydraulic line 48 extends from the pump to the flow control valve 42. Thus, the first power takeoff 34, by way of the hydraulic pump 38, acts as an output and the second power takeoff 36 and hydraulic motor 44 define an input to the transmission 32 which drives the drive shaft 50. By driving the drive shaft 50, one or more of the rear tires 22 may be turned to drive the vehicle 12 along the railroad track assembly 13 (FIG. 1). The drive shaft 50 may operate through one or more differentials 52 in order to drive the tires 22. Additionally, although the depicted embodiment shows rotation of one or more rear tires 22, it is within the scope of the present invention that the system be utilized to drive the forward tires 20 alternatively or in addition to the rear tires 22.

Figure 4:
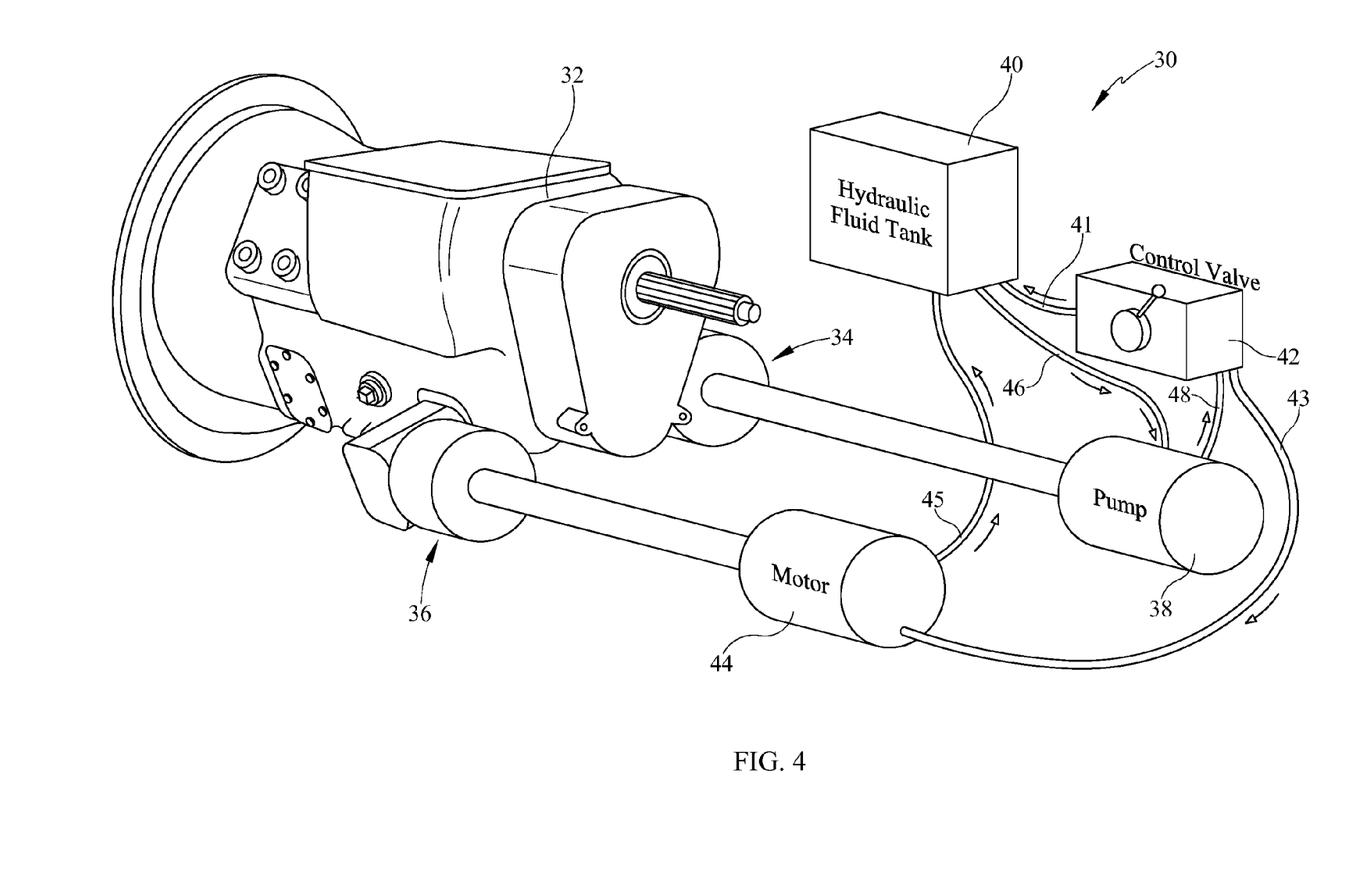
FIG. 4 is a perspective view of an exemplary auxiliary drive system.

Referring now to FIG. 4, a perspective view of an exemplary auxiliary drive system 30 is depicted. At one end of the assembly 30 is the transmission having a first power takeoff 34 and a second power takeoff 36, each of which are connected to the transmission for operation. Due to the transmission 32 gear configuration, the first power takeoff 34 continuously spins regardless of whether the vehicle 12 is in gear or not. When the first power takeoff 34 is engaged, the pump 38 creates hydraulic fluid pressure which moves hydraulic fluid to the control valve 42. This valve 42 as previously described is located in the auxiliary cab or crane control area 56 such that the operator may control the speed of the vehicle 12 from such remote location. The valve 42 directs fluid to the motor 44 during operation and controls the flow rate of hydraulic fluid, which in turn controls the speed of the motor and therefore the speed of the vehicle 12. The motor 44 provides input to the second PTO 36 which, when engaged, causes rotation of the drive shaft 50 (FIG. 3). When the control valve 42 is actuated to allow more flow, the motor 44 speed increases causing the PTO 36 to turn the gears internal to the transmission 32 and drive shaft 50 at a higher velocity. Gear ratios within the transmission may be adjusted to vary speed of the drive shaft relative to hydraulic flow rates. When the control valve 42 is closed, the motor 44 speed is reduced slowing the PTO and consequently slowing the drive shaft 50. The motor 44 also has a hydraulic line 45 returning to the hydraulic tank 40 where the fluid is stored and may cool before moving through the circuit again.

In operation, the user will disengage the transmission 32 from the engine 31 and will engage the PTOs 34, 36 in the main cab 21 so that rotation of PTO 34 operates to rotate pump 38 and further so that PTO 36 engages the transmission 32 to cause the drive shaft 50 to rotate. The engagement of the PTOs precludes use of the PTO when the transmission 32 is engaged or in gear with the engine 31. Such engagement between the engine 31 and transmission 32 would cause damage to the pump 38 and motor 44 during normal road travel. A user may also apply a brake, for example an air brake from the main cab 21of the vehicle. Next, a user releases air brakes on the vehicle 12. This may be done in the auxiliary cab 56. At this point, the vehicle 12 may be moved utilizing the hydraulic control valve 42 wherein increase in flow rate causes increase in speed of the motor and subsequently movement of the vehicle 12. Conversely, decrease in the flow rate causes a decrease in speed of the vehicle 12. Desirably, the control valve 42 may be set to a desired flow rate to effect a desired vehicle 12 speed for tie plate distribution or other maintenance functions along a railroad 13.

One alternative embodiment in the braking system may be a hydraulic brake assembly or valve. Such may be utilized in the PTO hydraulic circuit as an alternative, or in addition, to the air brake previously discussed.

Alternative embodiments may be utilized wherein an auxiliary engine may be utilized to power the hydraulic pump 38. Alternatively, a generator may be positioned on the vehicle to power the pump 38. In either of these embodiments, the electric or hydraulic pump drives the motor 44 and drives the driveshaft 50 through the transmission 32.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. An auxiliary drive system, comprising:
a transmission having a housing containing a plurality of gears and further having at least first and second power takeoffs at said housing;
a hydraulic pump connected to and driven by said first power takeoff of said transmission, said pump producing flow and being in fluid communication with a hydraulic motor;
said hydraulic motor operably connected to said second power takeoff wherein said second power take-off is utilized as an input to said transmission;
a control valve to vary flow rate of hydraulic fluid to said hydraulic motor;
said hydraulic motor and said hydraulic pump being mechanically downstream of a connection between an engine and said transmission;
said hydraulic motor driving said second power take off and a drive shaft operably connected to said transmission when said transmission is in a neutral position.

2. The system of claim 1, said transmission having gears operably associated with said first power takeoff and said second power takeoff.

3. The system of claim 2, said gears determining speed of rotation of said drive shaft.

4. The system of claim 1, at least one of said first and second power takeoffs rotating when said transmission is in said neutral position.

5. The system of claim 1, one of said first and second power takeoffs causing rotation of said driveshaft of said vehicle.

6. The system of claim 1, said system operably driving a high-rail vehicle for use on a rail.

7. The system of claim 1, wherein a speed of said pump is constant.

8. The system of claim 1, wherein a speed of said motor is adjustable to change vehicle speed.

9. The system of claim 8 wherein said hydraulic control valve is in fluid communication with said pump and said motor to adjust said vehicle speed.

10. A method of driving a high-rail vehicle with an auxiliary drive system, comprising:
providing a transmission having a housing containing a plurality of gears and further having at least first and second power takeoffs at said housing;
driving a hydraulic pump with said first power takeoff of a vehicle transmission;
driving a hydraulic motor with said hydraulic pump;
driving said second power takeoff of said vehicle transmission with said hydraulic motor wherein said first and second power takeoffs are mechanically downstream of a connection between a vehicle engine and said transmission; and,
driving a drive shaft connected to said vehicle transmission with said second power takeoff and said hydraulic motor.

11. The method of claim 10, further comprising adjusting speed of said vehicle by changing speed of said motor.

12. The method of claim 11 further comprising changing said speed of said motor with a hydraulic control valve.

13. The method of claim 12, further comprising driving tires of said vehicle which are operably connected to said driveshaft.

14. The method of claim 10, further comprising coupling said hydraulic pump and said hydraulic motor with a hydraulic fluid tank.

15. The method of claim 10, further comprising driving said second power takeoff with said first power takeoff.

16. An auxiliary drive system, comprising:
a transmission which is connectable to a prime mover and produces an output torque for driving a driveshaft;
said transmission having a housing containing a plurality of gears and further having at least first and second power takeoffs at said housing, said first and second power takeoffs located mechanically downstream of a connection between said transmission and said prime mover;
a pump in fluid communication with a hydraulic motor;
said pump drivably engaged by one of said power takeoffs;
said hydraulic motor operably connected to the other of said power takeoffs and in fluid communication with said hydraulic pump, wherein said hydraulic motor provides an input to said transmission;
a control valve to vary flow rate to said hydraulic motor;
said other of said power takeoffs driving a driveshaft operably connected to said transmission when said transmission is in a neutral position.

17. The auxiliary drive system of claim 16, said one of said power takeoff rotatable when said transmission is in said neutral position.

18. The auxiliary drive system of claim 16 further comprising a hydraulic tank in fluid communication with said pump, said motor and said control valve.

19. The auxiliary drive system of claim 16 wherein said rotation of said second power takeoff causes rotation of said driveshaft.

20. The auxiliary drive system of claim 16, said pump rotating at a constant speed.

21. The auxiliary drive system of claim 16, said pump being electric.

22. The auxiliary drive system of claim 21, said pump being powered by a generator.

23. The auxiliary drive system of claim 16, said second power takeoff turning said driveshaft when said transmission is in said neutral position.

24. The auxiliary drive system of claim 16, said first power takeoff turning when said transmission is in said neutral position.

* * * * *